No. 630,711. Patented Aug. 8, 1899.
F. JAYCOX.
WAGON RUNNING GEAR.
(Application filed Apr. 3, 1899.)
(No Model.)
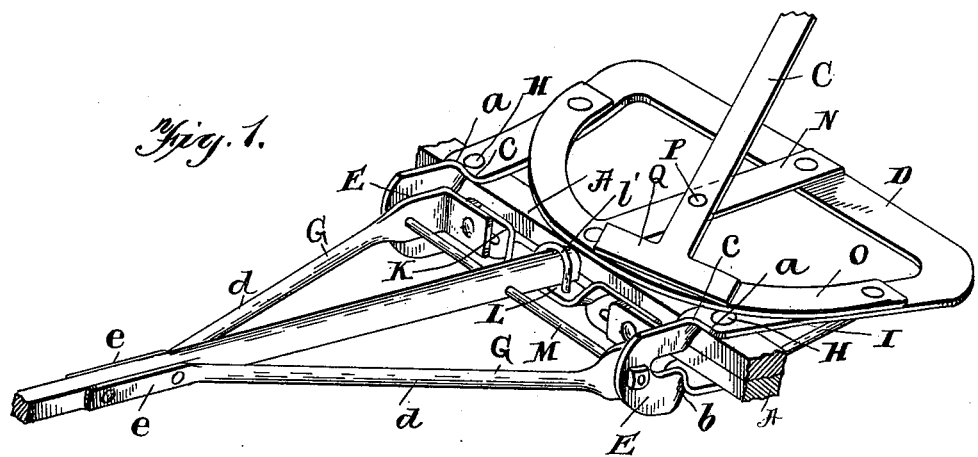
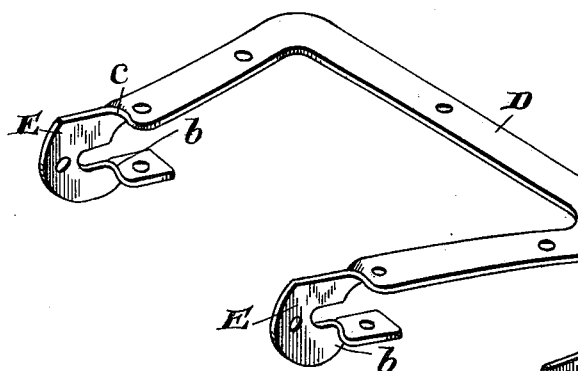
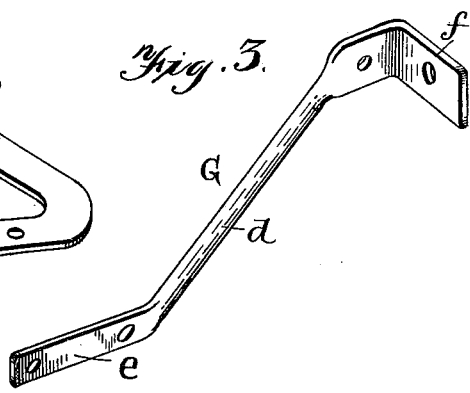
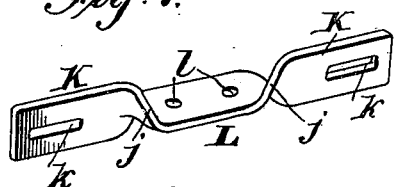
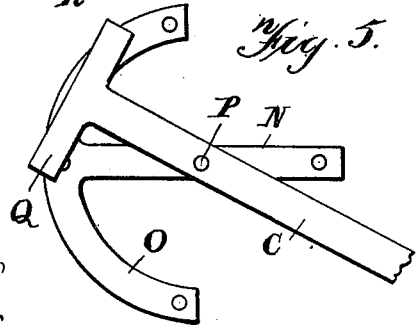
Witnesses
Geo. E. Fuch
Chas. R. Wright Jr.
Inventor
Ferris Jaycox,
by A. S. Pattison,
Attorney.
THE NORRIS PETERS CO., PHOTO-LITHO., WASHINGTON, D. C.

UNITED STATES PATENT OFFICE.

FERRIS JAYCOX, OF GARRISON, NEW YORK.

WAGON RUNNING-GEAR.

SPECIFICATION forming part of Letters Patent No. 630,711, dated August 8, 1899.

Application filed April 3, 1899. Serial No. 711,569. (No model.)

*To all whom it may concern:*

Be it known that I, FERRIS JAYCOX, a citizen of the United States, residing at Garrison, in the county of Putnam and State of New York, have invented new and useful Improvements in Wagon Running-Gear, of which the following is a specification.

My invention relates to improvements in wagon running-gear, and pertains to that portion of the running-gear which is attached to the front axle of a wagon.

The object of my invention is to provide a strong, durable, and cheap running-gear for the front axle of a wagon, which is composed essentially of two pieces, one attached to the front axle and the other forming the attachment for the pole.

In the accompanying drawings, Figure 1 is a perspective view of a front axle, showing my invention attached thereto. Fig. 2 is a detached perspective view of the member attached to the axle. Fig. 3 is a detached perspective view of one of the braces. Fig. 4 is a detached perspective view of the adjustable bar K. Fig. 5 is a top plan view of the front part of the reach and its connection.

A indicates the front axle of a wagon, and C the front end of the reach.

D is the axle attachment, which is essentially U-shaped, as illustrated, and extending in rear of the axle. The front ends of this axle attachment are twisted at the points $a$ to extend at right angles to the rearwardly-extending portion and then doubled backward, forming a U-shaped vertical portion E, the extremity of this U-shaped vertical portion being twisted, as shown at $b$, thus bringing its extremity parallel with the main U-shaped portion of the attachment. From this description it will be seen that the U-shaped ends E form ears, between which the pole attachment G is pivotally supported. It will also be noted that the rearwardly-extending portion forms a fifth-wheel for the reach, and that this axle attachment is constructed of one piece of metal. The upper twisted portions $a$ are cut away, as shown at $c$. The attachment is connected with the axle through the medium of transverse bolts H passing through the U-shaped portion D just in rear of the twisted portions $a$ and through the extremities of the U-shaped portions or ears E. Preferably the rearwardly-extending portion D is braced by the brace-rods I, which have their rear ends connected to the under side of the U-shaped or fifth-wheel portion D, and extends under the axle and attached by the bolts passing therethrough, as clearly shown.

The pole attachment is composed of a plate having a horizontal middle portion L, provided with bolt-holes $l$, and the vertically-twisted ends K, provided with openings for securing it to the braces G, said braces having the rounded converging portions $d$ and their other ends flattened at $e$ and attached to the pole. The inner ends of the braces G are bent, as shown at $f$, and provided with bolt-holes to receive the bolt that fastens the plate thereto. The inner end of the pole rests upon the horizontal portion L and a clip passing over the pole and into the openings $l$. The bolt M passes through the pole and through the braces G and the ears E, whereby the pole is pivotally supported.

From the above description it will be seen that I have produced a durable and cheap front gear for wagons composed, essentially, of two pieces. The attachments are cheap to produce and easily and quickly put in place upon a wagon.

When it is desired to produce a short-turning vehicle, I provide a reach-bar T, pivoted to the stem of an anchor-shaped plate M, the arms O of which are secured to the parallel portions of the U-shaped part Z. The reach C is preferably provided with a cross-head Q for providing a broad sliding surface for the front end of the reach. This arrangement pivots the front running-gear of the wagon at a point in rear of the front axle, thus enabling the wagon to be turned in a shorter space than possible where the reach is pivoted directly over the front axle, as is usual.

Having thus described my invention, what I claim, and desire to secure by Letters Patent, is—

1. A running-gear attachment for wagons comprising a U-shaped flat bar having its extremities twisted at right angles to form forwardly-projecting ears and the extremities of the ears twisted parallel with the U-shaped portion thereof to pass under the axle, substantially as described.

2. A pole attachment for wagons composed of a flat bar having a transverse rear portion, forwardly-extending straight portions with their ends converging and attached to the pole, the rear portion twisted to form a horizontal seat for the rear end of the pole, substantially as described.

3. A running-gear for the front end of wagons composed essentially of two portions, one formed of a flat bar and essentially U-shaped with its ends twisted to form vertical supporting-ears for the pole, and a pole attachment formed of a flat bar with a transverse rear portion forming a seat for the pole, forwardly-extending vertical portions, the said ears and vertical portions having registering openings for supporting-pivots, the front ends of the pole attachment converging and attached to the pole, substantially as described.

4. In a running-gear the combination with an axle provided with vertically forwardly extending ears, a plate between said ears and having a horizontal central portion provided with a clip, converging braces attached to the pole and their inner ends connected to the plate between the ears and a bolt passing through the pole, the braces and the ears, substantially as described.

5. In a running-gear, the combination with an axle, a U-shaped flat plate having its forward portion twisted to form vertical ears and the ends bent under the axle, a plate between the ears and having a horizontal central portion, converging braces attached to the pole at their outer ends and their inner ends connected to the plate between the ears, and a bolt passing through the pole, the braces and the ears, substantially as described.

6. In a running-gear the combination with an axle, a U-shaped flat plate having its forward ends attached to the axle, an anchor-shaped plate attached to the U-shaped plate, and a T-shaped reach-bar pivoted to the anchor-shaped plate, substantially as described.

In testimony whereof I have hereunto set my hand in the presence of two subscribing witnesses.

FERRIS JAYCOX.

Witnesses:
JOHN P. DONOHOE,
EUGENE M. CRAWFORD.